May 3, 1966   R. S. WORMSER   3,249,318
SAFETY SAFE AND REEL FOR ELECTRICAL EQUIPMENT
Filed April 16, 1964

INVENTOR
ROBERT S. WORMSER
BY Beaman & Beaman
ATTORNEYS

United States Patent Office

3,249,318
Patented May 3, 1966

3,249,318
SAFETY SAFE AND REEL FOR ELECTRICAL
EQUIPMENT
Robert S. Wormser, 49 Salem St., Hillsdale, Mich.
Filed Apr. 16, 1964, Ser. No. 360,362
5 Claims. (Cl. 242—85.1)

The invention pertains to a safety device for electrical equipment, and particularly relates to a safety device for electrical equipment employing a power supply cord having a connector affixed to the end thereof.

Many types of electrically powered devices such as saws, drills, lathes, etc., and many electrically powered appliances are inherently dangerous, particularly to children and other persons not familiar with the equipment. To render electrically powered apparatus relatively safe, many manufacturers employ key-operated switches whereby the equipment cannot be energized until a key is inserted into the switch. While such key-operated switches are quite effective from the safety standpoint, their incorporation into electrical equipment is expensive and not practical in many instances.

It is an object of the invention to provide a safety device for electrical equipment having a power cord with a connector on the end thereof, wherein the connector may be locked within a housing to prevent unauthorized use of the electrical equipment energized through the power cord.

A further object of the invention is to provide safety equipment for electrical apparatus which is of economical manufacture and which may be universally employed with any electrical device embodying a power supply cord having a connector associated with the end thereof.

Another object of the invention is to provide a safety device for electrical equipment using a flexible power cord having an electrical connector affixed to the end thereof, wherein the safety device renders the connector inaccessible to unauthorized persons and simultaneously provides storage means for the power cord.

Figure 1:
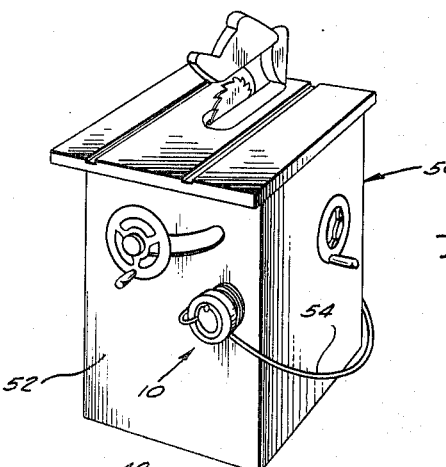
Figure 2:
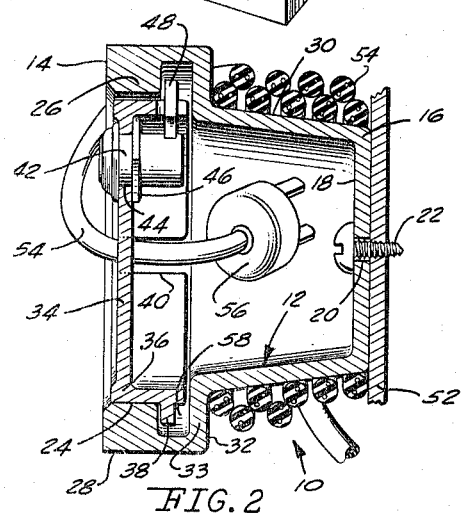
Figure 3:
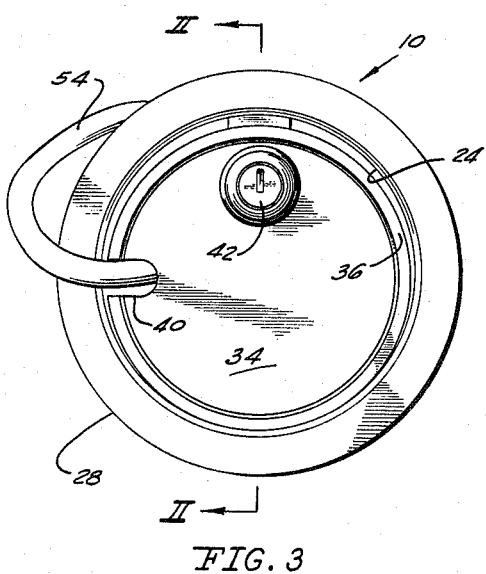
Figure 4:
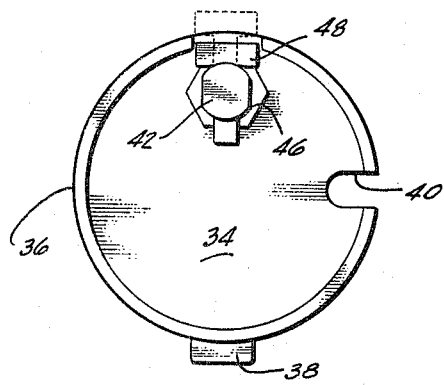

These and other objects of the invention arising from the details and relationships of the components of an embodiment thereof will be apparent from the following description and accompanying drawings wherein:

FIG. 1 is a perspective view of a bench saw employing the electrical safety device in accord with the invention, FIG. 2 is an elevational, diametrical, sectional, detail, enlarged view of the safety device of the invention, as taken along section II—II of FIG. 3, FIG. 3 is a front, elevational view of the safety device of the invention having a power cord associated therewith, and FIG. 4 is an elevational view of the back side of the housing cover.

Basically, the safety device in accord with the invention comprises a "safe" in which the connector affixed to the end of an electrical power cord may be locked. Means are provided on the exterior of the device for storing the power cord.

With particular reference to FIG. 2, it will be noted that the safety device in accord with the invention includes a housing 10 having a longitudinal wall portion 12. The wall portion 12 has an end 14 and an end 16 defined in opposed relationships. The end 16 constitutes a base portion and is provided with a radially extending wall 18 having an opening 20 defined therein for receiving a fastener 22 whereby the housing 10 may be attached to a support member.

The end 14 of the wall portion 12 is provided with an opening 24 and an inwardly formed annular flange 26 extends inwardly about the wall portion adjacent the opening. The wall portion 12 includes a substantially cylindrical portion 28, from which the flange 26 depends, and a conically surfaced portion 30 converging in the direction of the base portion wall 18. A radially extending shoulder surface 32 is defined on the shoulder portion 33 which connects the exterior wall portions 28 and 30.

A cover 34 is adapted to close the opening 24. The cover 34 is preferably of a generally circular and planar configuration so as to correspond with the configuration of the opening 24. The cover is provided with a peripheral portion 36 from which a radially extending projection 38 extends. A power cord receiving recess 40 is defined in the peripheral portion of the cover 34, and is of such a width as to permit a power cord to be received therein, but is of less width than the electrical connector attached to the end of the power cord. A key lock 42 is mounted within the cover opening 44 by a nut 46 and, as will be apparent from FIG. 4, includes a radially extending latch 48 which may be selectively extended beyond, or retracted inwardly from, the peripheral portion 36 by rotation of a key inserted into the lock.

The safety device of the invention is employed in the following manner:

As shown in FIG. 1, a typical installation of the device will consist of mounting the safety device housing 10 to the electrical device with which it is to be associated. In FIG. 1 a bench saw 50 is shown for purposes of illustration, and the housing 10 is attached to a vertical shroud wall 52 of the saw by means of the fastener 22, FIG. 2.

When the saw 50 is not being used, the power cord 54 supplying electricity to the saw motor is wound about the conical wall portion 30, as will be apparent from FIGS. 1 and 2. The cord 54 is readily received on the wall portion 30 and maintained thereon by the shoulder 32 and the wall 52 of the saw. After substantially all of the power cord 54 has been wound on wall portion 30, the end of the cord and the male plug connector 56 attached thereto, are inserted into the housing 10 through the opening 24. The cover 34 is then placed on the housing so that the projection 38 is received in the annular recess 58 between the flange 26 and the shoulder portion 33, as shown in FIG. 2. Of course, to permit placement of the cover, the cord 54 must be received within the cover recess 40. When the cover 34 is positioned as shown in FIG. 2, the lock 42 may be rotated by means of a key, not shown, to radially extend the latch 48 outwardly into the recess 58, as shown. Removal of the key thereby locks the end of the power cord and the plug connector 56 within the housing 10, and prevents unauthorized use of the saw 50. By merely unlocking the cover 34 and removing the plug connector from the housing 10, the power cord may be unwound from portion 30 of the housing and when the plug connector 56 is connected to an electrical receptacle, the saw may be used in the normal manner.

It will, therefore, be appreciated that the invention effectively prevents unauthorized use of the electrical device associated therewith, and simultaneously serves as a storage means for the electric power cord. Also, it will be appreciated that upon mounting the housing 10 to a wall, or other fixed support means, and locking of the plug connector of the power cord of small hand tools or appliances therein, theft and unauthorized borrowing of the power tools or electrical apparatus will be discouraged and prevented.

It is appreciated that modifications to the disclosed invention may be apparent to those skilled in the art without departing from the spirit and scope thereof, for instance, the recess 40 could be defined in the housing 10, and it is intended that the invention be defined only by the scope of the following claims.

I claim:
1. A safety device for electrical apparatus employing a power supply cord having a connection member attached to an end thereof of greater transverse dimension than the transverse dimension of the cord comprising, in combination,
   (a) a housing having a chamber defined therein,
   (b) a cover adapted to close said chamber, a peripheral portion defined on said cover,
   (c) a power supply cord receiving recess defined in said cover and intersecting said cover peripheral portion, said recess being of greater dimension than the transverse dimension of said cord and less than the transverse dimension of said connection member, the intersection of said recess with said cover peripheral portion permitting the cord to be placed within or removed from said recess when said cover is removed from a closing relationship with said chamber, and
   (d) means adapted to lock said cover upon said housing to close said chamber whereby a cord connection member may be received and locked within said housing.

2. A safety device for electrical apparatus employing a power supply cord having a connection member attached to an end thereof comprising, in combination,
   (a) a housing including a wall portion having opposed ends, a base portion having mounting means defined therein closing one end of said wall portion and an opening defined in the other wall portion end,
   (b) an exterior shoulder defined on said housing wall portion defining a surface facing in the direction of said base portion, said housing wall portion intermediate said shoulder and said base portion defining power cord storage means,
   (c) a cover adapted to close said opening defined in said other wall portion end,
   (d) a power supply cord receiving opening defined adjacent said opening, and
   (e) means adapted to lock said cover upon said housing to close said opening whereby a cord connection member may be received and locked within said housing.

3. A safety device for electrical apparatus employing a power supply cord having a connection member attached to an end thereof comprising, in combination,
   (a) a housing including a wall portion having opposed ends, a base portion having mounting means defined therein closing one end of said wall portion and an opening defined in the other wall portion end,
   (b) an exterior shoulder defined on said housing wall portion defining a surface facing in the direction of said base portion, said housing wall portion intermediate said shoulder and said base portion defining power cord storage means,
   (c) a cover adapted to close said opening defined in said other wall portion end, a peripheral portion defined on said cover, and
   (d) a power supply cord receiving recess defined in said cover and intersecting said cover peripheral portion.

4. In a safety device for electrical apparatus as in claim 3 wherein:
   (a) said wall portion intermediate said shoulder and said base portion is of a conical configuration converging toward said base portion.

5. A safety device for electrical apparatus employing a power supply cord having a connection member attached to an end thereof comprising, in combination,
   (a) a housing including a wall portion having opposed ends, a base portion having mounting means defined therein closing one end of said wall portion and an opening defined in the other wall portion end,
   (b) an exterior shoulder defined on said housing wall portion defining a surface facing in the direction of said base portion, said housing wall portion intermediate said shoulder and said base portion defining power cord storage means and being of a conical configuration converging toward said base portion,
   (c) a cover adapted to close said opening defined in said other wall portion end, a peripheral portion defined on said cover,
   (d) a power supply cord receiving recess defined in said cover and intersecting said cover peripheral portion,
   (e) a radially extending projection defined on said cover and radially extending beyond said peripheral portion,
   (f) a radially inwardly extending flange defined on said housing wall portion adjacent said opening defined therein, and
   (g) lock means mounted on said cover adapted to lock said cover on said housing to close said opening whereby a cord connection member may be received and locked within said housing, said lock means including a radially movable latch adapted to selectively lockingly cooperate with said flange, said latch and said cover projection being adapted to be interposed between said flange and said base portion.

References Cited by the Examiner
UNITED STATES PATENTS

| 1,408,261 | 2/1922 | Brookhart | 242—85.1 |
| 1,675,193 | 6/1928 | Omsk | 242—137.1 |
| 2,517,118 | 8/1950 | Lee | 242—85.1 |

MERVIN STEIN, *Primary Examiner.*

N. L. MINTZ, *Assistant Examiner.*